United States Patent [19]

Murai et al.

[11] Patent Number: 5,093,590

[45] Date of Patent: Mar. 3, 1992

[54] LINEAR MOTOR DRIVEN CONVEYING APPARATUS

[75] Inventors: Masasumi Murai, Tokorozawa; Jun Nishiyama, Amagasaki, both of Japan

[73] Assignee: Tsubakimoto Chain Company, Osaka, Japan

[21] Appl. No.: 469,216

[22] Filed: Jan. 24, 1990

[30] Foreign Application Priority Data

Mar. 16, 1989 [JP] Japan ................ 1-29102

[51] Int. Cl.⁵ .......................................... H02K 41/00
[52] U.S. Cl. ........................................... 310/12
[58] Field of Search ................................. 310/12

[56] References Cited

U.S. PATENT DOCUMENTS

| | | | |
|---|---|---|---|
| 3,648,085 | 3/1972 | Fujii | 310/54 |
| 4,694,209 | 9/1987 | Shindou | 310/12 |
| 4,839,545 | 6/1989 | Chitayat | 310/12 |
| 4,945,269 | 7/1990 | Kamm | 310/15 |

Primary Examiner—Steven L. Stephan
Assistant Examiner—Judson H. Jones
Attorney, Agent, or Firm—Ferrill and Logan

[57] ABSTRACT

A linear motor driven conveyor apparatus is disclosed for conveying trucks carrying articles to be processed through a paint booth or other treatment area having a dirt-laden atmosphere, and water supply means are provided to produce a continuously flowing film of water over the upper surfaces of the primary members of the linear motor to keep such surfaces free of contaminants.

4 Claims, 4 Drawing Sheets

1

LINEAR MOTOR DRIVEN CONVEYING APPARATUS

FIELD OF INVENTION

This invention relates to linear motor driven conveying apparatus and specifically to improvements in such apparatus for preventing foreign matter, such as paint, dust and the like, from entering into the clearance gap between primary and secondary members of a linear motor for conveying trucks so that trucks carried by such apparatus may be conveyed smoothly.

BACKGROUND OF INVENTION

Recently linear motor driven conveying apparatus have become widely used for conveying bodies during a painting process, such as in assembly lines for automotive bodies.

Such linear motor driven conveying apparatus are adapted to convey, by means of a linear motor, trucks, each of which supports an automotive body. However, since paint can drop on and adhere to the upper surfaces of the primary members of the linear motor and become sandwiched between the primary members and the secondary members mounted to the truck, hindrance to the conveyance is caused.

Also, it is troublesome and time-consuming to remove the paint thus adhered to the primary members.

SUMMARY OF THE INVENTION

The present invention provides a linear motor driven conveying apparatus for conveying trucks by means of linear motor comprising primary members provided on a traveling path of the trucks and secondary members mounted on the trucks, characterized in that water discharge apertures are provided in the upper surface of the primary members to cause water to flow over the surface.

The trucks are conveyed by the propelling force generated between the primary members and the secondary members. Water is discharged onto the upper surface of the primary member through the water discharging apertures; and a water film is formed thereon.

Thus, paint, which may adhere to the surface of the primary member, will be washed away along with the water, leaving the surface clean.

Consequently, the linear motor driven conveying apparatus according to the present invention provides the following advantages:

1. Since the water discharging apertures are formed on the surface of the primary members, and paint or dust, which may drop thereon, are swept away with water, such foreign matter will not become sandwiched between the primary members and the secondary members, thereby keeping the clearance between the primary members and the secondary members constant, which contributes to the smooth conveyance of the trucks.
2. Since paint does not adhere onto the primary members, paint removal operation is unnecessary, thereby facilitating maintenance of the conveying apparatus.

EMBODIMENTS

With reference to the accompanying drawings, the preferred embodiments are explained below.

Figure 1:
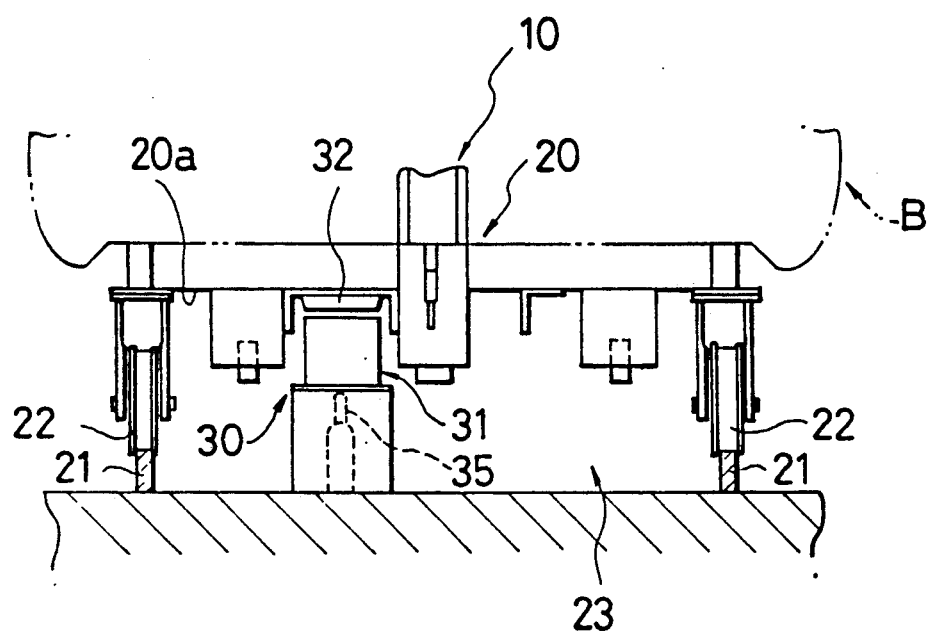
FIG. 1 is a front view of an embodiment of the present invention.
Figure 2:
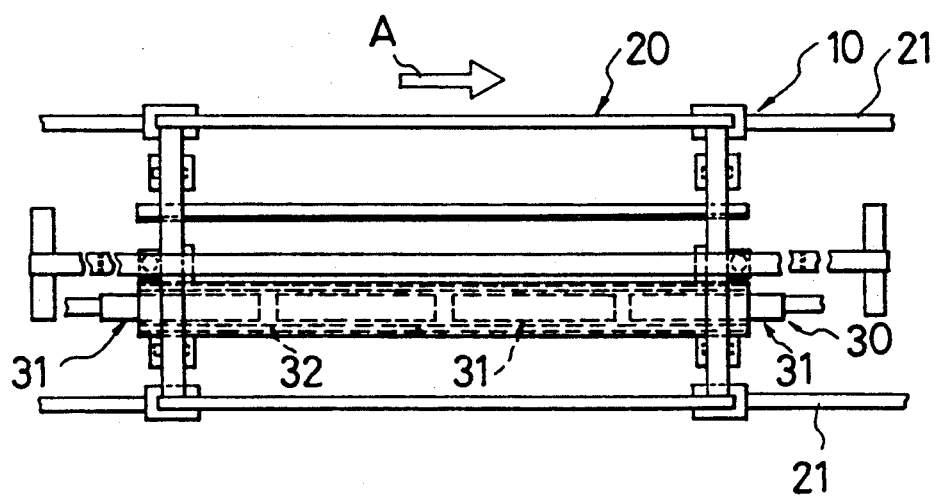
FIG. 2 is a plan view of FIG. 1.
Figure 3:
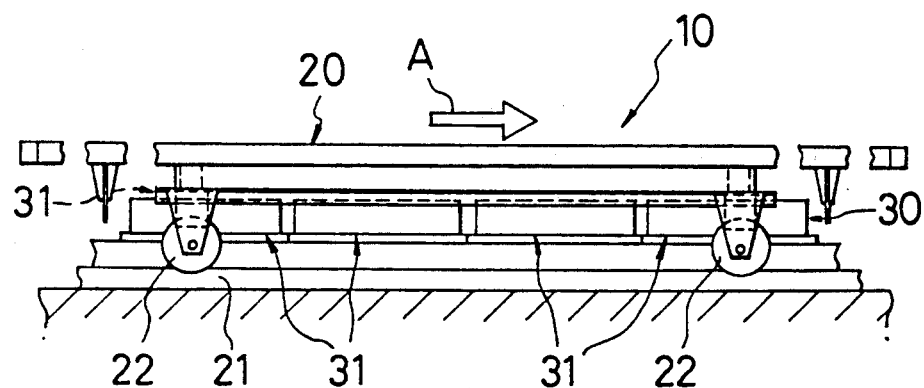
FIG. 3 is a left side view of FIG. 1.

FIGS. 1 to 3 show a linear motor driven conveying apparatus 10 for use in a painting process in assembly lines of automotive bodies, which mainly comprises trucks 20 and a linear motor 30. The linear motor 30 may be constructed as shown in U.S. Pat. No. 4,867,070, dated Sept. 19, 1989, the disclosure of which is incorporated herein by reference.

The truck 20 is capable of carrying an automotive body B and is provided with four wheels 22 for running on the rails 21, 21.

The linear motor 30 is adapted to serve as a driving source for the trucks 20, and includes primary members 31 provided on the traveling path 23 between the rails 21, 21, and a secondary member 32 mounting on the lower surface 20a of the truck 20.

Figure 4:
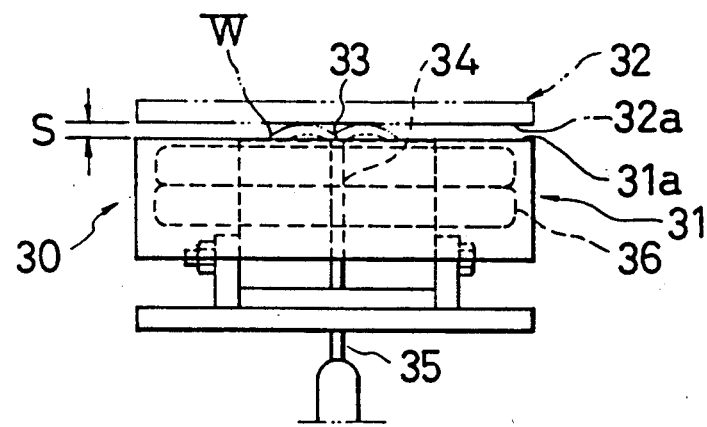
FIG. 4 is a front view of a linear motor.
Figure 5:
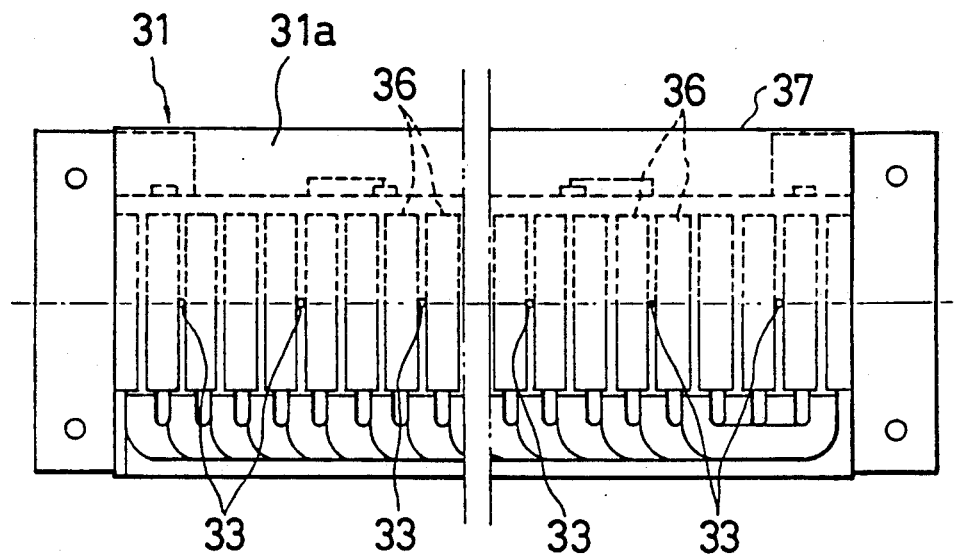
FIG. 5 is a plan view of a primary member in which half of the protective molding of a primary member is removed.
Figure 6:
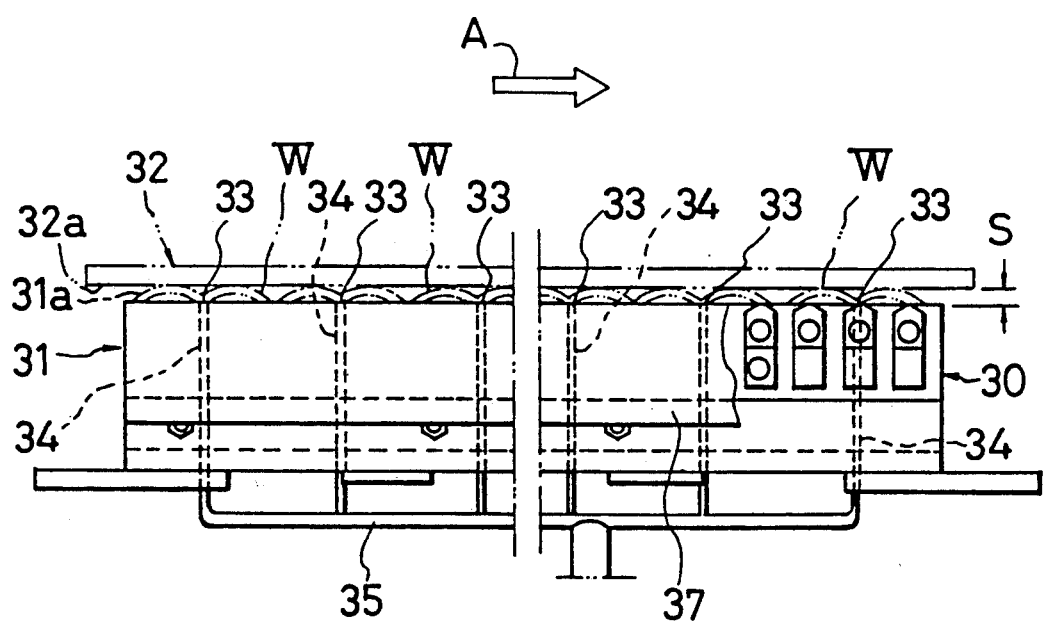
FIG. 6 is a side view of a linear motor in which the molding of a primary member is partially removed.

Formed on the upper surface 31a (FIGS. 4 to 6) of the primary member 31 opposite to the secondary member 32, are a plurality of water discharging apertures 33, the upper ends of which are flush with the upper surface 31a of the primary member 31. Each water discharging aperture 33 is formed at one end of a conduit 34 provided between the coils 36, 36 of the primary member 31. Each conduit 34 is connected to a pipe 35, which in turn is connected to a pump (not shown).

The primary member 31 is wholly covered with a molding or protective cover or coating 37 made of resin and the like, and thus is made waterproof.

Operations will be explained hereinbelow.

The trucks 20, which support the bodies B, are conveyed on the rails 21, 21 by the propelling force generated between the primary members 31 and the secondary members 32 in the direction indicated by arrow A in FIG. 2. During such conveying motion, the bodies B are painted; and at the same time, water W, which is discharged by the pump, is ejected from the water discharging apertures 33. The water W forms a water film on the surface of the primary member 31, and then flows down from the edges of the primary member 31.

During the painting operation, paint which drops onto the upper surface 31a of the primary member 31 is swept away by water W discharged from the water discharging apertures 33 and falls down with water W. By adjusting the ejecting force of the water, the water may be adapted to be discharged against the lower surface 32a of the secondary member 32 as well. With this, the lower surface 32a of the secondary member 32 may also be maintained clean.

Accordingly, since paint is never sandwiched between the primary members 31 and the secondary members 32, the clearance S between the primary members 31 and the secondary members 32 may be kept constant which assures smooth conveyance of the trucks 20; and acceleration or deceleration of the trucks 20 may be effected smoothly.

Although not shown in the above-mentioned embodiments, there is usually provided gratings on the floor of a painting booth so that water flows thereunder. Since paint, which has escaped the articles to be painted, is adapted to drop onto the water surface, there will be no particular problem in supplying water to the upper surface of the primary members as described in the foregoing embodiment.

Incidentally, the trucks 20 associated with the above-described embodiment are adapted to be conveyed solely by means of the linear motor 30. A truck 50 of a conveying apparatus 60 shown in FIG. 7 is adapted to be conveyed by linear motor 40 during the painting process; and by means of a chain conveyor 11 provided beneath the floor in other processes.

In the painting process, the truck 50 is adapted to be supported by the wheels 52, 52 traveling within the channel-shaped rails 51, 51 opposing each other so as to prevent swinging. A lower portion of the truck 50 is covered by the covers 54, 54. During traveling in such an area, the truck 50 is conveyed by propelling force generated between the primary members 41 disposed on the traveling path 53 and the secondary members 42 mounted on the lower surface of the truck 50. During the painting operation, the truck 50 is stopped and positioned by a stopper mechanism 55. The floor 56 comprises a grating structure as explained above such that the dropping paint may be swept away by the water. Even in such a conveying apparatus, there is fear of the paint entering into the covers 54, 54 through the clearance. However, paint which drops onto the primary members 41 is washed away by water discharged from the water discharging apertures 43 formed in the primary members 41.

Figure 7:
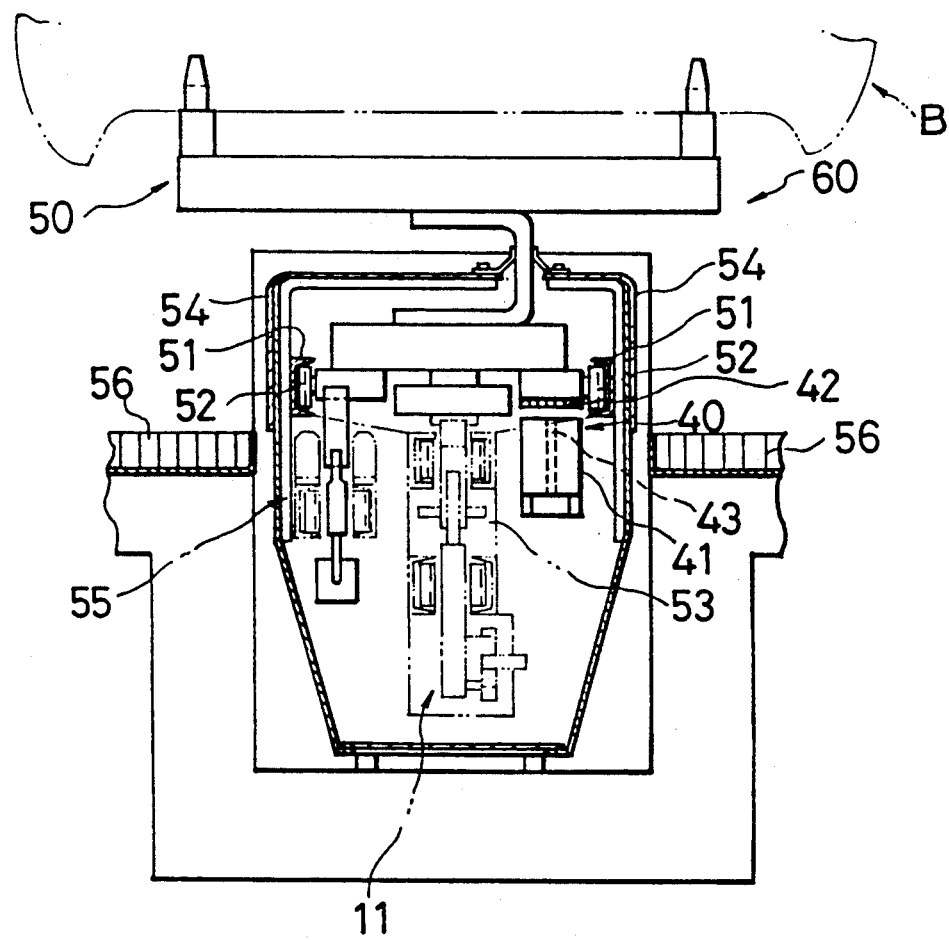
FIG. 7 is a front view, partly in section, of another embodiment of the invention.

In the embodiment shown in FIG. 7, speed-up of the manufacturing process as a whole may be achieved due to the use of the linear motor in the painting process only, which is capable of removing paint easily as aforementioned as well as high speed conveyance; and due to the use of a conventional chain conveyor in other processes where there is no fear of paint adhering.

Incidentally, in the above-described embodiments, the water discharging apertures are aligned in the center of the upper surface of the primary member; but they may be arranged in two rows adjacent the edges of the primary members. What is essential is to provide water film on the entire upper surface of the primary member.

Although the above-described embodiments pertain to the prevention of paint adhering to the primary members in the painting booth, the present invention may also be useful for preventing dust from adhering to the primary members in cases where the linear motor driven conveying apparatus is used in places full of dust, so long as the requisite water source is available.

What is claimed is:

1. A linear motor driven conveying apparatus for conveying trucks by means of a linear motor, said linear motor including primary members provided along the path of travel of the trucks and secondary members mounted on the trucks, said primary members having upper surfaces facing toward and spaced from said secondary members providing a gap between said primary and secondary members, and water supply means to supply water to the upper surfaces of the primary members and cause water to flow across said upper surfaces within said gap to keep said upper surfaces free of foreign deposits.

2. Apparatus in accordance with claim 1 wherein said primary members have a waterproof protective coating applied to their surfaces.

3. Apparatus in accordance with claim 1 or 2 wherein said water supply means includes pipes terminating in water orifices adjacent the upper surfaces of said primary members at said gap.

4. Apparatus in accordance with claim 3 wherein said water supply means is adapted to supply a continuous film of water flowing across the upper surfaces of said primary members.

* * * * *